(12) United States Patent
Trainin

(10) Patent No.: US 8,457,089 B2
(45) Date of Patent: Jun. 4, 2013

(54) HIGH-THROUGHPUT (HT) RECEIVING STATION AND METHOD FOR DETERMINING A RATE FOR CONTROL RESPONSE FRAMES IN NON-HT FORMAT

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 13/326,534

(22) Filed: Dec. 15, 2011

(65) Prior Publication Data

US 2012/0082122 A1    Apr. 5, 2012

Related U.S. Application Data

(63) Continuation of application No. 11/774,448, filed on Jul. 6, 2007, now Pat. No. 8,098,640.

(51) Int. Cl.
*H04W 4/00* (2009.01)
*H04L 1/00* (2006.01)

(52) U.S. Cl.
USPC ............................................. 370/338; 370/249

(58) Field of Classification Search
USPC .................................. 370/338, 352, 465, 210
See application file for complete search history.

(56) References Cited

U.S. PATENT DOCUMENTS

| 7,058,039 | B2 | 6/2006 | Wang et al. | |
|---|---|---|---|---|
| 7,263,105 | B2 | 8/2007 | Trainin | |
| 8,098,640 | B2 | 1/2012 | Trainin | |
| 2004/0120292 | A1 | 6/2004 | Trainin | |
| 2005/0226222 | A1* | 10/2005 | Qian | 370/352 |
| 2005/0226268 | A1* | 10/2005 | Wang et al. | 370/465 |
| 2006/0250943 | A1* | 11/2006 | Mujtaba et al. | 370/210 |
| 2007/0291913 | A1 | 12/2007 | Trainin | |
| 2008/0013505 | A1 | 1/2008 | Trainin | |

FOREIGN PATENT DOCUMENTS

| EP | 1 372 290 | * | 6/2002 |
|---|---|---|---|
| EP | 1372290 A1 | | 12/2003 |
| EP | 02360175.0 | | 12/2003 |
| JP | 2006020299 | | 1/2006 |
| JP | 4934723 | | 2/2012 |
| TW | 441199 B | | 6/2001 |
| TW | 571525 B | | 1/2004 |
| WO | WO-2008008712 A1 | | 1/2008 |

OTHER PUBLICATIONS

"U.S. Appl. No. 11/774,448 Non-Final Office Action mailed Oct. 8, 2010", 12 pgs.
"U.S. Appl. No. 11/774,448, Final Office Action mailed Apr. 11, 2011", 15 pgs.
"U.S. Appl. No. 11/774,448, Notice of Allowance mailed Sep. 12, 2011", 8 pgs.

(Continued)

*Primary Examiner* — Michael Faragalla
(74) *Attorney, Agent, or Firm* — Schwegman, Lundberg & Woessner, P.A.

(57) ABSTRACT

Embodiments of a high-throughput (HT) receiving station and method for determining a rate for response frames in non-HT format are generally described herein. Other embodiments may be described and claimed. The rate may be a non-HT basic rate that is a highest of a basic rate set that is less than or equal to a non-HT reference rate that is selected based on a modulation and coding scheme (MCS) of a received spatial stream.

15 Claims, 4 Drawing Sheets

OTHER PUBLICATIONS

"U.S. Appl. No. 11/774,448, Response filed Jan. 10, 2011 to Non Final Office Action mailed Oct. 8, 2010", 10 pgs.
"Japanese Application Serial No. P2009-519611, Non Final Office Action mailed Jul. 11, 2011", 7 pgs.
"Japanese Application Serial No. P2009-519611, Office Action Response filed Oct. 12, 2011", 12 pgs.
"PCT Application Serial No. PCT/US2007/072989, International Search Report mailed Dec. 4, 2007", 3 pgs.
"PCT Application Serial No. PCT/US2007/072989, Written Opinion Dec. 4, 2007", 4 pgs.
"Taiwan Application Serial No. 96125106, Office Action mailed Sep. 5, 2011", 6 pgs.
"Taiwan Application Serial No. 96125106, Response Filed Nov. 9, 2011 to Office Action mailed Sep. 15, 2011", 1 pg.
"Taiwan Application Serial No. 96125106, Search Report mailed Sep. 5, 2011", 2 pgs.
"Chinese Application Serial No. 200780026384.2, Office Action mailed Jan. 31, 2012", 10 pgs.

* cited by examiner

HIGH-THROUGHPUT (HT) RECEIVING STATION AND METHOD FOR DETERMINING A RATE FOR CONTROL RESPONSE FRAMES IN NON-HT FORMAT

PRIORITY CLAIM

This application is a continuation of U.S. patent application Ser. No. 11/774,448, filed on Jul. 6, 2007, now issued as U.S. Pat. No. 8,098,640, which is incorporated herein by reference in its entirety.

TECHNICAL FIELD

Some embodiments of the present invention pertain to wireless communication systems. Some embodiments relate to wireless local area networks (WLANs). Some embodiments relate to multiple-input multiple-output (MIMO) transmissions.

BACKGROUND

High throughput wireless local area networks (WLANs) may transmit more than one spatial data stream using more than one antenna. The receiving station may need to transmit an acknowledge frame or other control response frame back to the transmitting station, however the transmitting station may have difficulty calculating the contents of the duration/ID field of the transmitting frame and the modulation and coding scheme used for the acknowledge frame.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
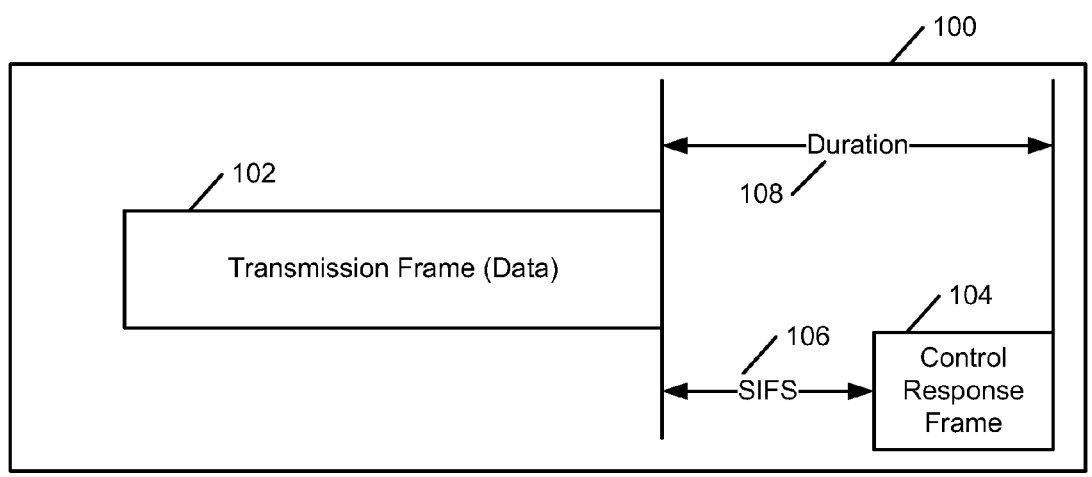
FIG. 1 illustrates a transmission timeline in accordance with some embodiments.

FIG. 1 illustrates a transmission timeline 100 in accordance with some embodiments of the present invention. The transmission timeline 100 includes a transmission frame 102 containing data, a control response frame 104, a short inter-frame space (SIFS) 106 and a duration/ID field 108.

A transmitting wireless device may send data within the transmission frame 102. The data may be in the form of a high-throughput (HT) PHY protocol data unit (PPDU) according to various embodiments. When received by a receiving wireless device, the receiving wireless device may respond with a control response frame 104. The control response frame 104 may be an acknowledgement (ACK) frame, a clear to send (CTS) frame or other response. The control response frame 104 may be a HT PPDU.

Under the protection of a network allocation vector (NAV), the control response frame 104 may be sent to the transmitting wireless device within a duration 108 after the initial data has been sent in the transmission frame 102. The amount of time between the end of the data transmission in the transmission frame 102, and the start of the response in the control response frame 104 is the SIFS 106. The size of the SIFS 106 may be a constant. It may useful for the transmitting wireless device to know or be able to calculate the duration 108 in order to protect the control response frame 104 by asserting the duration/ID field in the transmission frame 102 to the calculated value.

Some embodiments of the present invention relate to the calculation of the rate to transmit control response frames. Some embodiments may allow for the calculation of a basic rate for control response frame 104 transmission used to respond incoming data transmission frames 102. Some embodiments of the present invention may allow a transmitting wireless device to calculate the duration 108 or the contents of the duration/ID field in the transmission frame 102. In these embodiments, the receiving wireless device may transmit its control response frames 104 using a predictable MCS. In some embodiments, the transmissions may include multiple-input multiple-output (MIMO) transmissions in 20 and 40 MHz channels, although the scope of the invention is not limited in this respect.

One problem with some convention systems, such as systems that may relate to be TGn extension of the IEEE 802.11 spec referenced below, is that features such as MIMO and a HT channels allow higher transmission rates. The High Throughput (HT) PHY Protocol Data Unit (PPDU) carrying data in the transmission frame 102 may be sent at any MCS within the supported MCS sets. To allow a transmitting wireless device to calculate the contents of the Duration/ID field 108, the HT PPDU carrying the response should be sent by the receiving station at a predictable MCS. This MCS may be one of the basic MCS sets that a WLAN station shall be able transmit and receive. To help solve this problem, some embodiments of the present invention select one of the basic MCSs in relation to the MCS of the transmission frame 102.

Figure 2:
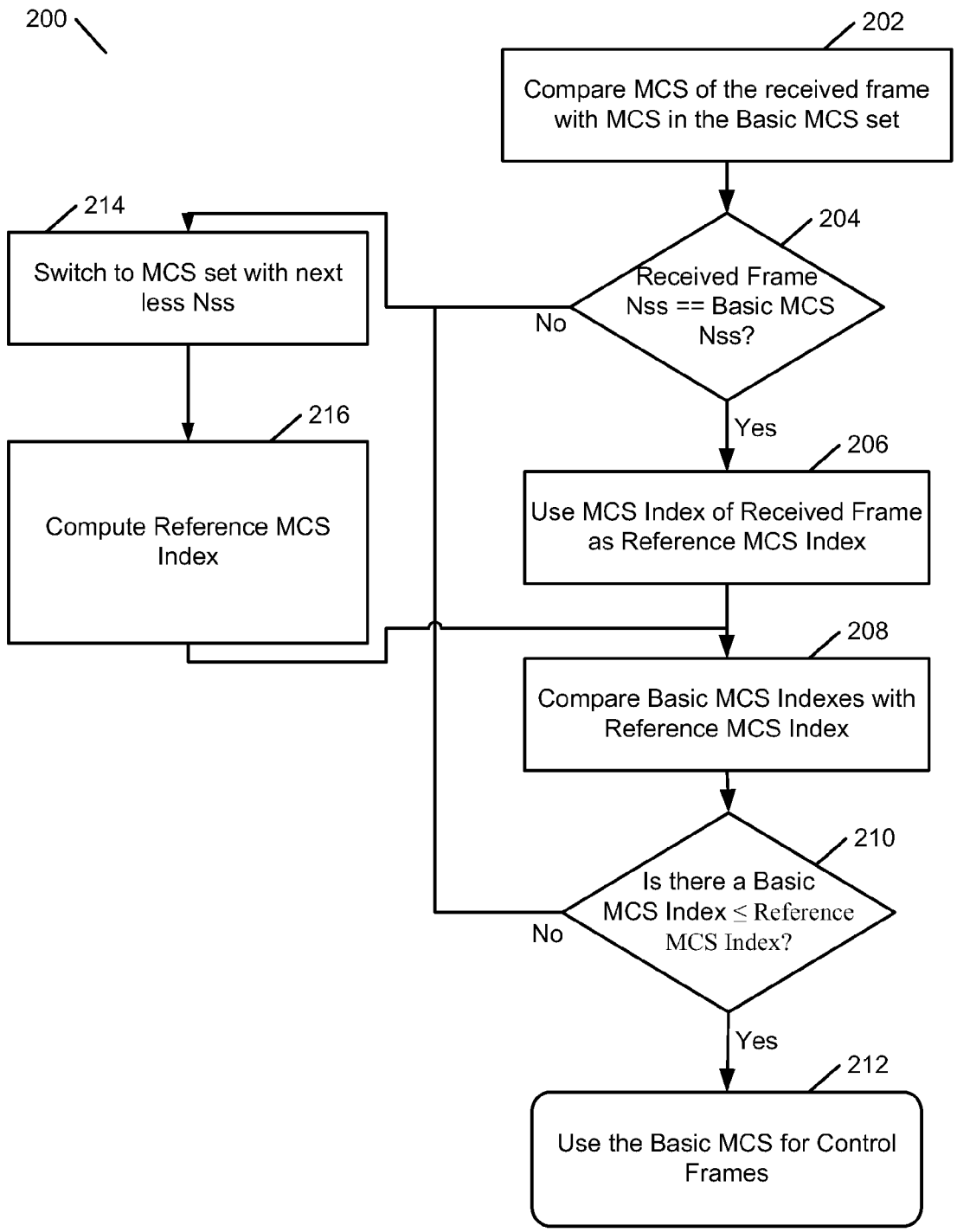
FIG. 2 is a flow diagram illustrating a procedure for calculating a modulation and coding scheme (MCS) in accordance with some embodiments.

FIG. 2 is a flow diagram illustrating a procedure 200 for calculating a MCS in accordance with some embodiments. The procedure 200 begins with a wireless device receiving a frame and comparing the MCS of that received frame with a group of MCSs (block 202). The group of MCSs may be associated with a particular communication specification according to various embodiments. A particular group of MCSs to be used for comparison may be determined based on whether the received frame has a Nss, which is equal to the Nss of a MCS set associated with a particular access point or basic service set (BSS) (204). This group of MCSs may be referred to as a full MCS set for a particular Nss.

If the Nss of the received frame is equal to the Nss of one of the MCS sets, then the MCS index of the received frame may be used as a reference MCS index (block 206). The MCS index is an identifier used to identify a particular MCS for transmission. The MCS may include one or more modulation levels, a code ratio, a data rate, and other characteristics. Once the reference MCS index is determined, the reference MCS index may be compared with the basic MCS indexes within a basic MCS set that was determined to have the same Nss as the received frame (block 208). The basic MCS set is a subset of the group of MCSs associated with a particular Nss. The basic MCS set may be determined by the BSS. The comparison entails determining whether the basic MCS set includes a basic MCS index which is less than or equal to the reference MCS index (block 210). The highest basic MCS index which is less than or equal to the reference MCS index may be chosen to use as the MCS for transmitting a control response frame (block 212).

If either there is not a MCS set with a Nss equal to the Nss of the received frame, or there is not a basic MCS index which is less than or equal to the reference MCS index, then a different reference MCS index may be calculated. First, a full MCS set with the highest Nss less than the received frame Nss may be chosen out of the available MCS sets (block 214). Then a reference MCS index may be computed using the chosen full MCS set (block 216). As described above, once the reference MCS index is determined, it may be compared with the basic MCS indexes in the basic MCS set (block 208). Once the highest basic MCS index which is less than or equal to the reference MCS index is found within the basic MCS set (block 210), it may be used for transmitting the control response frame (block 212).

Figure 3:
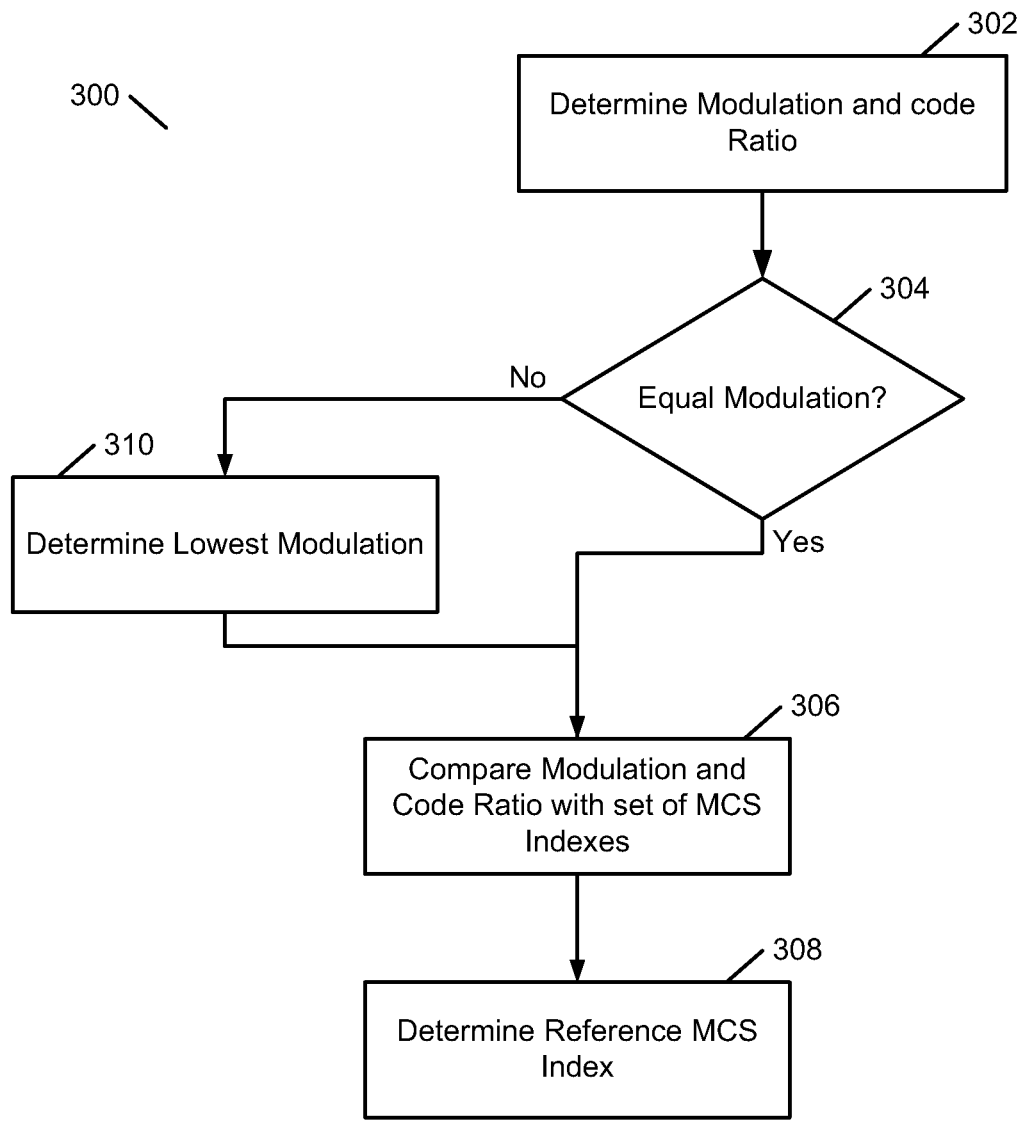
FIG. 3 is a more detailed flow diagram illustrating a procedure for calculating a reference MCS index in accordance with some embodiments.

FIG. 3 is a more detailed flow diagram illustrating a procedure 300 for calculating a reference MCS index in accordance with some embodiments. The procedure 300 may represent a more detailed view of block 216 with reference to FIG. 2. The procedure 300 begins by determining the modulation level and the code ratio associated with a received transmission frame (block 302). A determination may be made regarding whether the received frame employs equal or unequal modulation (block 310). If unequal modulation is employed, the lowest modulation level may be determined for use in future calculations (block 310).

The modulation level, whether it is the modulation level in an equal modulation frame, or the lowest modulation level in an unequal modulation frame, combined with the code ratio may be compared with a modulation and code ratio in a full MCS set for a particular Nss. The full MCS set may contain a number of MCSs and associated indexes. The set of basic MCS indexes may be determined as described with reference to FIG. 2. A MCS index having the same modulation level and code ratio as in the received frame may be chosen to be used as the reference MCS index.

The description above assumes that the basic MCS sets include only basic MCS with equal modulation according to various embodiments. If a BSS includes MCS sets employing unequal modulation, then the modulation level to be used from a received frame with unequal modulation may be the highest modulation level. The calculations and comparisons, which follow, will be the same as described above.

Figure 4:
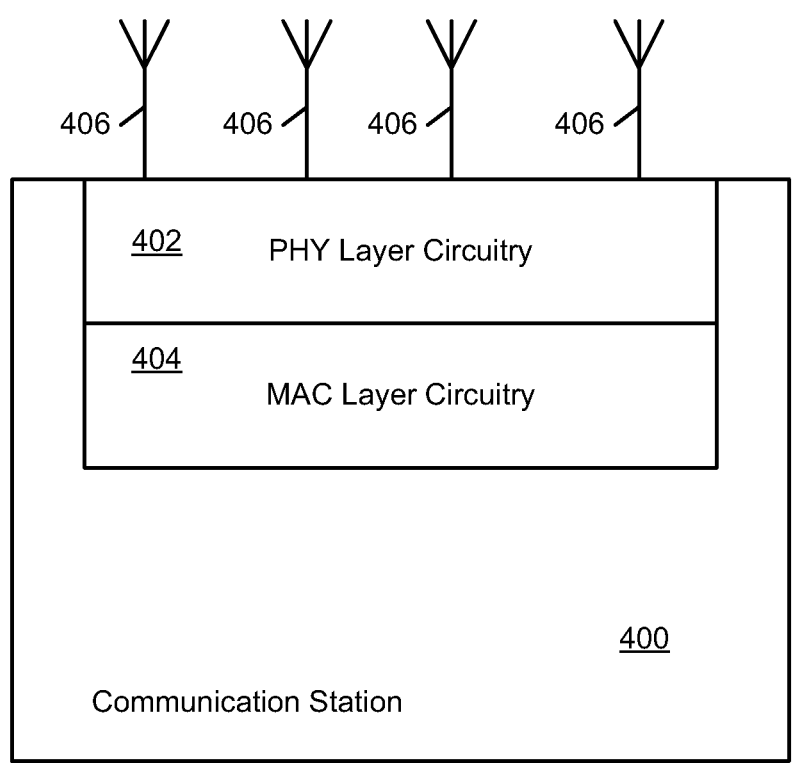
FIG. 4 illustrates a wireless communication station in accordance with some embodiments.

FIG. 4 illustrates a wireless communication station (STA) 400 in accordance with some embodiments. The STA 400, which may also be referred to as a wireless device, includes physical (PHY) layer circuitry 402, media access control (MAC) layer circuitry 404, and antennas 406.

The STA 400 may receive a wireless signal at the antennas 406. The wireless signal may contain a data frame. The PHY layer circuitry 402 may receive and decode the signal into the data frame for delivery to the MAC layer circuitry 404.

The MAC layer circuitry 404 may then compare the Nss of the data frame with a Nss of a MCS set associated with a BSS. From a basic MCS set, a basic MCS may be selected for use in transmitting a control response frame. One or more of the Nss, a modulation level, and a code ratio of the received frame may be used to determine the particular basic MCS to be used for transmission of the control response frame. A reference MCS may need to be calculated as described above to aid in determining a proper basic MCS to use. The control response frame may then be routed through the PHY layer circuitry 402, converted to a signal and transmitted via the antennas 406.

According to various embodiments the STA 400 may also include beamformer in communication with the PHY layer circuitry 402 and the antennas 406 to combine and/or weight the signals being transmitted and/or received through antennas 406. Additionally, the antennas 406 may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, two or more antennas may be used. According to some embodiments, instead of two or more antennas, a single antenna with multiple apertures may be used. In these embodiments, each aperture may be considered a separate antenna. Additionally, according to other embodiments, each antenna may be effectively separated to take advantage of spatial diversity and the different channel characteristics that may result between each of antennas 406 and another wireless communication device. In some embodiments, antennas 406 may be separated by up to 1/10 of a wavelength or more.

Although STA 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of STA 400 may refer to one or more processes operating on one or more processing elements.

In some embodiments, STA 400 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In other embodiments, STA 400 may communicate in accordance with a multiple access technique, such as orthogonal frequency division multiple access (OFDMA), although the scope of the invention is not limited in this respect. In some embodiments, STA 400 may be part of a wireless communication device that may communicate using spread-spectrum signals, although the scope of the invention is not limited in this respect.

In some embodiments, STA 400 may be a wireless local area network (WLAN) communication station, such as a Wireless Fidelity (WiFi) communication station, an access point (AP) or a WLAN mobile station (MS). In some other embodiments, communication station 100 may be part of a broadband wireless access (BWA) network communication station, such as a Worldwide Interoperability for Microwave Access (WiMAX) communication station, although the scope of the invention is not limited in this respect as STA 400 may be part of almost any wireless communication device.

According to various embodiments, STA 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

According to some embodiments, the STA 400 may be a device receiving a data transmission, or it may be a device sending the data transmission according to other embodiments. A STA 400, which is sending the data transmission, may perform the procedures described above with reference to FIGS. 2 and 3. The STA 400, which is sending the data transmission, may analyze its data transmission and the associated MCS in order to predict the basic MCS that will be used by the receiving device for sending its control response frame. By using the same procedure in the transmitting device and the receiving device, the transmitting device may be able to predict the basic MCS being used at the receiving device for its control response frame. This will allow the data frame being transmitted to have a properly calculated duration in its duration/ID field to handle the control response frame from the receiving device.

In some embodiments, the frequency spectrums used by STA 400 may comprise either a 5-GigaHertz (GHz) frequency spectrum or a 2.4 GHz frequency spectrum. In these embodiments, the 5 gigahertz (GHz) frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, STA 400 may receive signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, including techniques in accordance with the Task Group N (TGn) draft proposal for the IEEE 802.11n standard for MIMO WLAN communications, although the scope of the invention is not limited in this respect as they may also be suitable to transmit and/or receive communications in accordance with other techniques and standards. In some broadband wireless access network embodiments, STA 400 may receive signals in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005, "IEEE P802.11n™/D2.00 Draft STANDARD for Information Technology—Telecommunications and information exchange between systems—Local and metropolitan area networks-Specific requirements—Part 11: Wireless LAN Medium Access Control (MAC) and Physical Layer (PHY) specifications: Amendment: Enhancements for Higher Throughput" February 2007, and related amendments/versions. Some embodiments relate to the IEEE 802.11e proposed enhancement to the IEEE 802.11 WLAN specification that will include QoS (quality of service) features, including the prioritization of data, voice, and video transmissions.

According to an example embodiment, a transmitting wireless device may transmit a signal including a data frame. The MCS of that data frame may, for example, be described by Table 1 below:

TABLE 1

| MCS Index | Modulation | R | Data rate (Mb/s) |
| --- | --- | --- | --- |
| 28 | 16-QAM | 3/4 | 156.0 |

In this case, the data frame has a modulation level of 16-QAM, and a code ratio of 3/4. The Nss for this example data frame will be 4. If a BSS uses a number of MCS sets, the highest of which is Nss=2, the MCS set with Nss=2 may be used for the reference MCS index computation. The MCS indexes in the full MCS set for Nss=2 are described with reference to Table 2 below:

TABLE 2

| MCS Index | Modulation | R | Data rate (Mb/s) | Is it part of Basic MCS set? |
| --- | --- | --- | --- | --- |
| 8 | BPSK | 1/2 | 13.0 | Yes |
| 9 | QPSK | 1/2 | 26.0 | Yes |
| 10 | QPSK | 3/4 | 39.0 | Yes |
| 11 | 16-QAM | 1/2 | 52.0 | Yes |
| 12 | 16-QAM | 3/4 | 78.0 | No |
| 13 | 64-QAM | 2/3 | 104.0 | No |
| 14 | 64-QAM | 3/4 | 117.0 | No |
| 15 | 64-QAM | 5/6 | 130.0 | No |

In order to compute the reference MCS index to use with the procedure described above with reference to FIGS. 2 and 3, the modulation level and code ratio of the transmitted data frame may be compared with the those in the MCS set. MCS index 12 has the same modulation level and code ratio as the data frame: 16-QAM and 3/4 respectively. This MCS index may be used as the reference MCS index.

The reference MCS index of 12 may then be compared with those MCS indexes, which are in the basic MCS set of the same Nss associated with the BSS. In this case, the rightmost column of Table 2 shows which MCS indexes are in the basic MCS set. MCS index 12 is not in the basic MCS set in this example. To determine the basic MCS to use for control response frame transmission, the next less MCS index, which is in the basic MCS set, may be used. MCS index 11 is the next less index value. Therefore, Nss=2, 16-QAM modulation, 1/2 code ratio, and a 52.0 Mb/s data rate are the characteristics which may be applied to a communicated control response frame.

According to another example embodiment, a transmitting wireless device may transmit a signal including a data frame employing unequal modulation. The MCS of that data frame may, for example, be described by Table 3 below:

TABLE 3

| MCS Index | Modulation | | | R | Data rate (Mb/s) |
| --- | --- | --- | --- | --- | --- |
| | Stream 1 | Stream 2 | Stream 3 | | |
| 43 | 64-QAM | 16-QAM | 16-QAM | 1/2 | 91 |

In this case the data frame has a Nss=3, and of those three streams one is 64-QAM modulated, and two are 16-QAM modulated. In this example, if the BSS does not have a basic MCS set with Nss=3, the MCS set with Nss=2 (as in Table 2) may be used for calculations of the reference MCS index and basic MCS. Since MCS index 43 is not in the full MCS set represented by Table 2, a reference MCS may be calculated. Because the data frame uses unequal modulation, the modulation level that may be used for the reference MCS index calculation will be the lowest modulation level across the streams of the data frame MCS. The lowest modulation level used by a stream of the data frame is 16-QAM.

The reference MCS index may be determined by using 16-QAM modulation and 1/2 code ratio. According to Table 2, MCS index 11 has 16-QAM modulation and code ratio of 1/2. The reverence MCS index of 11 may then be checked to see if it is in the basic MCS set. In this case, the reference MCS index coincides with a basic MCS index. Therefore, the basic MCS index 11 may be used for control response frames, with Nss=2, 16-QAM modulation, 1/2 code ratio, and a 52.0 Mb/s data rate.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware and software. Some embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A high-throughput (HT) receiving station to operate in a wireless local area network (WLAN), the HT receiving station arranged to:
   receive a data frame sent from a transmitting station over a number of spatial streams (Nss) and over orthogonal frequency division multiplexed (OFDM) subcarriers, each spatial stream having a HT modulation and coding scheme (MCS);
   determine a rate for a response frame to be sent in response to receipt of the data frame based on the HT MCS of at least one of the spatial streams, the rate being a non-HT basic rate that is a highest of a basic rate set that is less than or equal to a non-HT reference rate that is selected based on the HT MCS; and
   transmit the response frame to the transmitting station without spatial multiplexing on one of the sets of OFDM subcarriers in accordance with the determined rate,
   wherein the data frame is configured in a HT format and the response frame is configured for transmission in a non-HT format,
   wherein the response frame is a control response frame comprising either an acknowledgement (ACK) frame or a clear-to-send (CTS) frame,
   wherein the data frame is a HT data frame that is received concurrently over two or more sets of orthogonal frequency division multiplexed (OFDM) subcarriers, each set providing a 20 MHz channel bandwidth,
   wherein the non-HT basic rate is a highest of a basic service set (BSS) basic rate set (BSSBasicRateSet), and
   wherein the BSSBasicRateSet is selected from a lookup table to be less than or equal to the non-HT reference rate.

2. The receiving station of claim 1 wherein the spatial streams includes at least a first stream (stream 1) and a second stream (stream 2),
   wherein the HT receiving station is to determine whether the spatial streams have equal modulation (EQM) schemes or unequal modulation (UEQM) schemes,
   wherein when the spatial streams have EQM schemes the rate for the response frame is determined from the modulation scheme of either stream 1 or stream 2, and
   wherein when the spatial streams have UEQM schemes the rate for the response frame is determined only from the modulation scheme of stream 1.

3. The receiving station of claim 2 wherein the data frame includes a duration ID field that indicates a duration that includes the response frame,
   wherein the transmitting station predicts the rate of the response frame to be received based on the MCS of the spatial-multiplexed streams, and
   wherein the transmitting station is to determine the duration ID field based in part on the predicted rate to allow the response frame to be protected by a network allocation vector (NAY) for the duration indicated.

4. The HT receiving station of claim 1 wherein the HT format includes a legacy preamble followed by a HT format preamble, and
   wherein the non-HT format includes a legacy preamble and is not followed by a HT format preamble.

5. A high-throughput (HT) receiving station to operate in a wireless local area network (WLAN), the HT receiving station comprising:
two or more antennas;
physical-layer circuitry to receive a data frame sent from a transmitting station over a number of spatial streams (Nss) and over orthogonal frequency division multiplexed (OFDM) subcarriers using the two or more antennas, each spatial stream having a HT modulation and coding scheme (MCS); and
processing circuitry to determine a rate for a response frame to be sent in response to receipt of the data frame based on the HT MCS of at least one of the spatial streams, the rate being a non-HT basic rate that is a highest of a basic rate set that is less than or equal to a non-HT reference rate that is selected based on the HT MCS,
wherein the physical-layer circuitry is to transmit the response frame to the transmitting station without spatial multiplexing on one of the sets of OFDM subcarriers in accordance with the determined rate,
wherein the data frame is configured in a HT format, the response frame is configured for transmission in a non-HT format, the HT format includes a legacy preamble followed by a HT format preamble, and the non-HT format includes a legacy preamble and is not followed by a HT format preamble.

6. The HT receiving station of claim 5 wherein the processing circuitry is to configure the physical layer circuitry and the antennas for multiple-input multiple-output (MIMO) operation.

7. A method for operating a high-throughput (HT) receiving station in a wireless local area network (WLAN), the method comprising:
receiving a data frame sent from a transmitting station over a number of spatial streams (Nss) and over orthogonal frequency division multiplexed (OFDM) subcarriers, each spatial stream having a HT modulation and coding scheme (MCS);
determining a rate for a response frame to be sent in response to receipt of the data frame based on the HT MCS of at least one of the spatial streams the rate being a non-HT basic rate that is a highest of a basic rate set that is less than or equal to a non-HT reference rate that is selected based on the HT MCS;
configuring the response frame for transmission in a non-HT format, the response frame being, a control response frame comprising either an acknowledgement (ACK) frame or a clear-to-send (CTS) frame; and
transmitting the response frame to the transmitting station without spatial multiplexing on one of the sets of OFDM subcarriers in accordance with the determined rate,
wherein the data frame is configured in a HT format and is a HT data frame that is received concurrently over two or more sets of orthogonal frequency division multiplexed (OFDM) subcarriers, each set providing a 20 MHz channel bandwidth,
wherein the non-HT basic rate is a highest of a basic service set (BSS) basic rate set (BSSBasicRateSet), and
wherein the method includes selecting the BSSBasicRateSet from a lookup table to be less than or equal to the non-HT reference rate.

8. The method of claim 7 wherein the spatial streams includes at least a first stream (stream 1) and a second stream (stream 2),
wherein the method includes determining whether the spatial streams have equal modulation (EQM) schemes or unequal modulation (UEQM) schemes,
wherein when the spatial streams have EQM schemes, the method includes determining the rate for the response frame from the modulation scheme of either stream 1 or stream 2, and
wherein when the spatial streams have UEQM schemes, the method includes determining the rate for the response frame only from the modulation scheme of stream 1.

9. The method of claim 8 wherein the data frame includes a duration ID field that indicates a duration that includes the response frame,
wherein the transmitting station predicts the rate of the response frame to be received based on the MCS of the spatial-multiplexed streams, and
wherein the transmitting station is to determine the duration ID field based in part on the predicted rate to allow the response frame to be protected by a network allocation vector (NAV) for the duration indicated.

10. The method of claim 7 wherein the HT format includes a legacy preamble followed by a HT format preamble, and
wherein the non-HT format includes a legacy preamble and is not followed by a HT format preamble.

11. A high-throughput (HT) receiving station comprising:
physical-layer circuitry to receive a data frame sent from a transmitting station over a number of spatial streams (Nss) includes at least a first stream (stream 1) and a second stream (stream 2) received over orthogonal frequency division multiplexed (OFDM) subcarriers using two or more antennas, each spatial stream having a HT modulation and coding scheme (MCS); and
processing circuitry to determine a rate for a response frame to be sent in response to receipt of the data frame based on the HT MCS of at least one of the spatial streams, the rate being a non-HT basic rate that is a highest of a basic rate set that is less than or equal to a non-HT reference rate that is selected based on the HT MCS,
wherein the physical layer circuitry is to transmit the response frame to the transmitting station without spatial multiplexing on one of the sets of OFDM subcarriers in accordance with the determined rate,
wherein the processing circuitry is to determine whether the spatial streams have equal modulation (EQM) schemes or unequal modulation (UEQM) schemes,
wherein when the spatial streams have EQM schemes, the rate for the response frame is determined from the modulation scheme of either stream 1 or stream 2, and
wherein when the spatial streams have UEQM schemes, the rate for the response frame is determined only from the modulation scheme of stream 1.

12. The HT receiving station of claim 11 wherein the data frame is configured in a HT format, and
wherein the response frame is configured for transmission in a non-HT format, and
wherein the response frame is a control response frame comprising either an acknowledgement (ACK) frame or a clear-to-send (CTS) frame.

13. The HT receiving station of claim 12 wherein the data frame is a HT data frame that is received concurrently over two or more sets of orthogonal frequency division multiplexed (OFDM) subcarriers, each set providing a 20 MHz channel bandwidth.

14. The HT receiving station of claim 13 wherein the non-HT basic rate is a highest of a basic service set (BSS) basic rate set (BSSBasicRateSet), and wherein the BSSBasicRateSet is selected from a lookup table to be less than or equal to the non-HT reference rate.

15. A method performed by a high-throughput (HT) receiving station arranged to operate in a wireless local area network (WLAN), the method comprising:

receiving a data frame from a transmitting station sent by a number of spatial-multiplexed streams (Nss) concurrently over two or more sets of orthogonal OFDM subcarriers, each spatial stream having a modulation and coding scheme (MCS), the data frame including a duration ID field;

determining a rate for a control response frame comprising either an ACK or CTS frame to be sent in response to receipt of the data frame based on the MCS of the spatial-multiplexed streams; and transmitting the control response frame to the transmitting station without spatial multiplexing on one of the sets of OFDM subcarriers in accordance with the determined rate, wherein the rate is a non-HT basic rate that is a highest of a basic rate set that is less than or equal to a non-HT reference rate that is selected based on the MCS wherein the duration ID field indicates a duration that includes the control response frame, wherein the transmitting station is to predict the rate of the control response frame to be received based on the MCS of each spatial-multiplexed stream of the data frame, and wherein the transmitting station is to determine the duration ID field based in part on the predicted rate to allow the control response frame to be protected by a network allocation vector (NAV) for the duration indicated.

* * * * *

UNITED STATES PATENT AND TRADEMARK OFFICE
CERTIFICATE OF CORRECTION

PATENT NO. : 8,457,089 B2  
APPLICATION NO. : 13/326534  
DATED : June 4, 2013  
INVENTOR(S) : Solomon Trainin Page 1 of 1

It is certified that error appears in the above-identified patent and that said Letters Patent is hereby corrected as shown below:

On the Title Page Item (56)

In Column 2, under "Other Publications", line 1, delete "11/774,448" and insert --11/774,448,--, therefor In Column 2, under "Other Publications", line 3, delete "11," and insert --1,--, therefor On page 2, in column 1, under "Other Publications", line 9, after "Opinion", insert --mailed--, therefor On page 2, in column 2, under "Other Publications", line 3, delete "Filed" and insert --filed--, therefor In the Claims In column 8, line 41, in claim 2, after "The", insert --HT--, therefor In column 8, line 53, in claim 3, after "The", insert --HT--, therefor In column 8, line 62, in claim 3, delete "NAY" and insert --NAV--, therefor In column 12, line 7, in claim 15, delete "MCS" and insert --MCS,--, therefor Signed and Sealed this  
Eighteenth Day of November, 2014

Michelle K. Lee  
*Deputy Director of the United States Patent and Trademark Office*